April 7, 1942.    C. J. WIERSIG    2,278,814
DETACHABLE GRAIN SAVING GUARD
Filed April 28, 1941
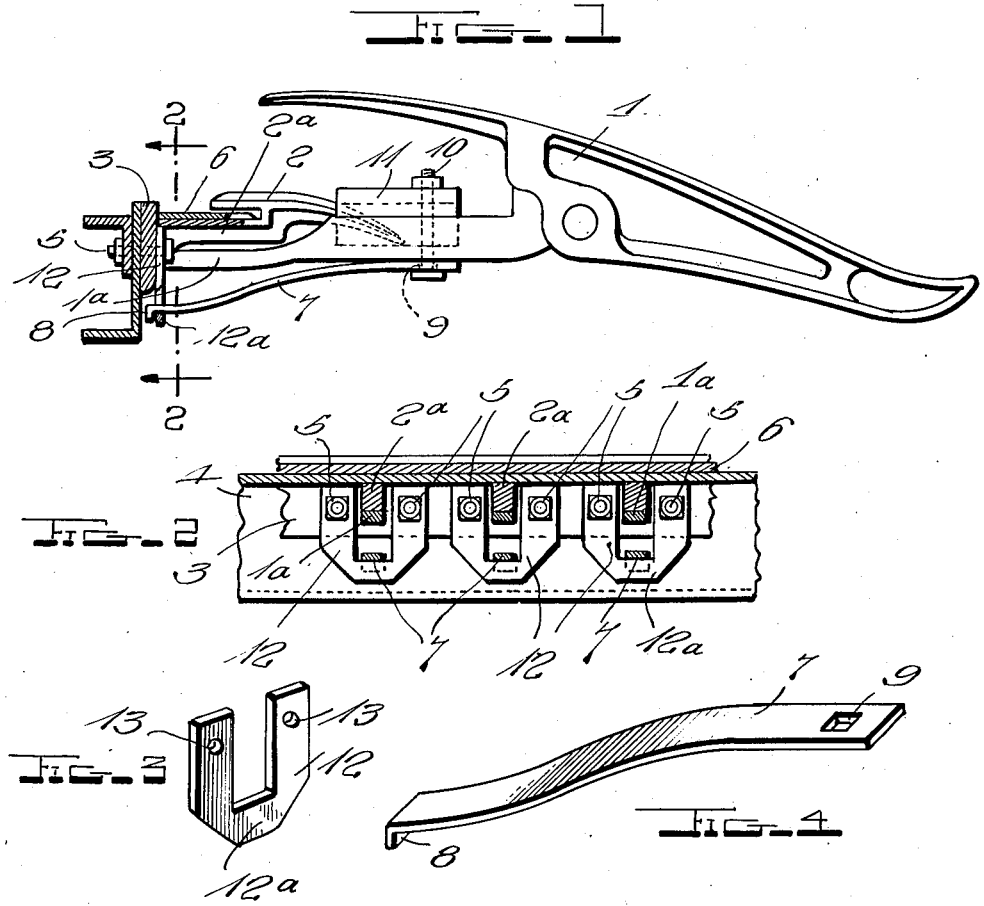
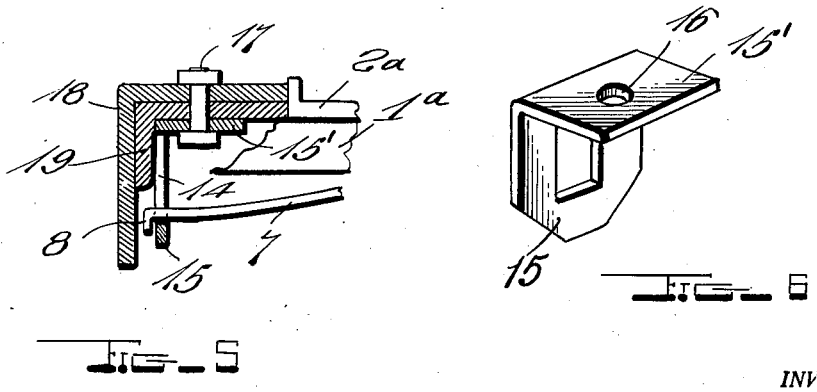
INVENTOR.
CARL J. WIERSIG,
BY
Attorney Patented Apr. 7, 1942

2,278,814

UNITED STATES PATENT OFFICE 2,278,814

DETACHABLE GRAIN SAVING GUARD

Carl J. Wiersig, Alva, Okla.

Application April 28, 1941, Serial No. 390,792

9 Claims. (Cl. 56—313)

This invention relates to a grain saving guard of the type used on binders, headers, and other harvesting machines of this nature. At present, guards are secured in place in cooperating relation to blade guards by bolts and it has been found that when it is desired to remove the grain saving guards it is very difficult to do so as the bolts become rusted. It has also been found that applying the grain saving guards is a tedious operation as the securing bolts for the blade guards must be individually removed and then replaced and tightened. During this operation the bolts or the nuts are liable to be lost and if the nuts are not tightened properly, the guards will not be firmly held in their proper positions.

Therefore, one object of the invention is to provide improved means for firmly but detachably mounting the grain guards, the means for holding the guards in place being such that the guards may be applied or detached without disturbing the bolts which hold the blade guards in place.

Another object of the invention is to provide grain guards with securing means consisting of brackets mounted against the sickle bar and resilient strips carried by the guards and adapted to be snapped into and out of engagement with the companion brackets.

Another object of the invention is to provide securing means of such construction that they may be applied to guards of a conventional construction, thus permitting the securing means to be sold as an accessory for use in connection with guards previously purchased or sold with a harvester.

Another object of the invention is to provide securing devices which are simple in construction, cheap to manufacture, and not liable to break when in use.

In the accompanying drawing:

Fig. 1 is a view showing a grain saving guard mounted in position for use by securing means of the improved construction.

Fig. 2 is a sectional view on the line 2—2 of Fig. 1.

Fig. 3 is a perspective view of a bracket constituting one element of the improved fastener.

Fig. 4 is a perspective view of a resilient strip constituting another element of the improved fastener.

Fig. 5 is a fragmentary view showing a modified form of bracket in use.

Fig. 6 is a perspective view of the modified form of bracket.

The grain saving guards 1 with which the improved fasteners are used are of conventional construction and are mounted in front of blade guards 2, with their shanks 1a disposed under the shanks 2a of the blade guards. The shanks of the blade guards project forwardly from the sickle bar 3 which is secured along the front of the platform 4 by bolts 5, and when the bolts are tightened, the guards 2 are held in supporting and shielding relation to the cutter.

The grain saving guards are to be securely but detachably held in place in cooperating relation to the companion guard blades and, in order to do this, each of the guards 1 is provided with a mounting strip 7 formed of spring steel or other resilient material. This strip extends longitudinally of the guard under the shank 1a thereof and is bent so that it curves downwardly and has its rear end spaced downwardly from the shank. The rear end of the strip is bent to form a depending hook 8 and, near its front end, the strip is formed with a square opening 9 to receive the bolt 10 by means of which the block 11 is secured to the guard. This bolt, therefore, serves to secure the spring strip to the guard as well as securing means for the block.

A U-shaped bracket 12 formed of strong metal, is secured vertically against the sickle bar by the bolts 5 which pass through openings 13 formed near upper ends of the bracket. This bracket extends downwardly below the sickle bar 3 and its bridge 12a is spaced from said sickle bar so that the hook 8 of the mounting strip or keeper 7 may engage over the bridge and have frictional engagement therewith to firmly but detachably hold the grain saving guard in place. Since the shank 1a of the guard 1 fits between arms of the bracket, it will be prevented from shifting transversely out of its proper position in abutting engagement with the sickle bar.

Instead of employing a U-shaped bracket, such as shown in Fig. 3, a bracket of the formation shown in Fig. 6 may be employed. This bracket has a body portion 15 which is substantially U-shaped but, instead of being secured by bolts 5, it is formed with an upper flange 15' having an opening 16 to receive a bolt 17. This bracket is for use in connection with a binder or other harvesting machine and includes in its construction, angle bars 18 and 19 which are secured to each other by a suitable number of bolts passing vertically through horizontal portions of the bars, and the bolts 17 serve to secure the brackets as well as serve to hold the bars in engagement with each other. When this form of bracket is in use, the grain saving guards are mounted in the same manner in which they are applied to the brackets 12. When it is desired to remove the guards, it is merely necessary to flex the spring strips upwardly a sufficient distance to release the hooks 8 from the bridges of the brackets and then draw the guards forwardly out of place.

Having thus described the invention, what is claimed is:

1. In combination with a sickle bar and blade guards projecting forwardly therefrom; grain saving guards in advance of the blade guards having shanks extending rearwardly under the blade guards for abutting engagement with the sickle bar, brackets carried by the sickle bar and having U-shaped portions extending downwardly from the sickle bar with their bridges spaced downwardly therefrom and their arms at opposite sides of the shanks, and resilient strips under shanks of the grain saving guards extending longitudinally thereof with their front ends secured to the shanks, said strips extending rearwardly at a downward incline and having hooks at their rear ends engaging over and back of the bridges of said brackets to detachably hold the grain saving guards in place.

2. In combination with a sickle bar and blade guards projecting forwardly therefrom; grain saving guards in advance of the blade guards having shanks extending rearwardly under the blade guards for abutting engagement with the sickle bar, brackets carried by the sickle bar and having U-shaped portions extending downwardly from the sickle bar with their bridges spaced downwardly therefrom and their arms at opposite sides of the shanks, and resilient strips carried by the grain saving guards and having free rear ends formed with depending hooks engaging bridges of said brackets and detachably holding the grain saving guards in place.

3. In combination with a sickle bar and blade guards projecting forwardly therefrom; grain saving guards in front of the blade guards, brackets carried by the sickle bar, and resilient keepers carried by the grain saving guards and engaging the brackets for detachably holding the grain saving guards in place.

4. In combination with a sickle bar and blade guards projecting therefrom; grain saving guards in front of the blade guards, brackets disposed vertically against the front face of the sickle bar, each bracket having side arms and a lower bridge, bolts passing through the side arms and through the sickle bar to hold the brackets in place, resilient strips extending longitudinally of the grain saving guards, bolts passing through forward end portions of said strips and through shanks of the grain saving guards securing front ends of the strips against under faces of the shanks, said strips extending rearwardly in downward diverging relation to the shanks, and hooks at rear ends of the strips engaging over bridges of the brackets to detachably hold the grain saving guards in place.

5. In combination with a sickle bar and blade guards projecting forwardly therefrom; grain saving guards in front of the blade guards, brackets disposed vertically and each having a U-shaped body and a forwardly extending flange at its upper end, bolts passing vertically through the flanges of said brackets to hold the brackets in place, and resilient keepers carried by the grain saving guards and having hooks engaging lower bridge portions of said brackets for detachably holding the grain saving guards in place.

6. Means for detachably holding a grain saving guard in place comprising a resilient strip, means to secure the front end of said strip against a grain saving guard, said strip extending rearwardly in downward diverging relation to the guard, the strip having a depending hook across its rear end, and a bracket having means for mounting the same vertically under a blade guard, the bracket being formed with a lower bridge detachably engaged by the hook of said strip.

7. Means for detachably holding a grain saving guard in place comprising a resilient strip formed with an opening adjacent its front end, a fastener passing through the opening to secure the strip to a grain saving guard, said strip extending rearwardly at a downward incline and having a depending hook at its rear end, and a bracket having means for mounting the same vertically under a blade guard and provided with a bridge portion across its lower end for engagement by the hook.

8. Means for detachably holding a grain saving guard in place comprising a resilient strip formed with an opening adjacent its front end, a fastener passing through the opening to secure the strip to a grain saving guard, said strip extending rearwardly at a downward incline and having a depending hook at its rear end, and a bracket having a bridge portion across its lower end for engagement by the hook, the brackets being U-shaped and having upper ends of its arms formed with fastener receiving openings.

9. Means for detachably holding a grain saving guard in place comprising a resilient strip formed with an opening adjacent its front end, a fastener passing through the opening to secure the strip to a grain saving guard, said strip extending rearwardly at a downward incline and having a depending hook at its rear end, and a bracket having a bridge portion across its lower end for engagement by the hook, the bracket being U-shaped and having a forwardly extending flange across its upper end formed with a fastener receiving opening.

CARL J. WIERSIG.